US010008228B1

(12) United States Patent
Nangare

(10) Patent No.: US 10,008,228 B1
(45) Date of Patent: Jun. 26, 2018

(54) METHOD AND APPARATUS FOR DETERMINING READ-HEAD DEVIATION USING ORTHOGONAL PREAMBLES

(71) Applicant: Marvell International Ltd., Hamilton (BM)

(72) Inventor: Nitin Nangare, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days. days.

(21) Appl. No.: 15/622,713

(22) Filed: Jun. 14, 2017

Related U.S. Application Data

(60) Provisional application No. 62/380,843, filed on Aug. 29, 2016.

(51) Int. Cl.
G11B 5/58 (2006.01)
G11B 5/596 (2006.01)
G11B 20/12 (2006.01)

(52) U.S. Cl.
CPC ...... *G11B 5/59627* (2013.01); *G11B 20/1217* (2013.01); *G11B 2020/1229* (2013.01); *G11B 2020/1238* (2013.01); *G11B 2020/1292* (2013.01)

(58) Field of Classification Search
CPC ........ G11B 20/10009; G11B 20/10046; G11B 20/10365; G11B 20/10361; G11B 20/10388; G11B 5/58; G11B 5/584; G11B 5/488
USPC ....... 360/64, 77.13, 75, 77.14, 73.08, 73.07, 360/78.04, 39, 77.01
See application file for complete search history.

(56) References Cited

U.S. PATENT DOCUMENTS

| 4,511,938 | A | 4/1985 | Betts |
| 5,381,281 | A | 1/1995 | Shrinkle et al. |
| 5,966,264 | A | 10/1999 | Belser et al. |
| 7,193,800 | B2 | 3/2007 | Coker et al. |
| 7,286,313 | B2 | 10/2007 | Erden et al. |
| 7,342,734 | B1 | 3/2008 | Patapoutian et al. |
| 7,362,536 | B1 | 4/2008 | Liu et al. |
| 7,440,224 | B2 | 10/2008 | Ehrlich et al. |
| 7,916,415 | B1 | 3/2011 | Chue |
| 8,339,722 | B1 | 12/2012 | Wu et al. |
| 8,879,193 | B1 * | 11/2014 | Burd ...................... G11B 5/584 360/64 |
| 9,153,264 | B1 | 10/2015 | Oberg et al. |
| 9,218,845 | B2 * | 12/2015 | Pan .................. G11B 20/10009 |
| 9,361,939 | B1 | 6/2016 | Eaton |

(Continued)

*Primary Examiner* — Nabil Hindi

(57) ABSTRACT

In a storage device, data is written to tracks on a storage medium. Data for each track includes a preamble. The preamble in any current track is orthogonal to the preamble in any track adjacent to the current track. A first read head is positioned over the current track and off-center toward a first adjacent track on a first side of the current track to detect first signals from among the current track, the first adjacent track, and a second adjacent track on a second side of the current track. A second read head is positioned over the current track and off-center relative to the current track toward the second adjacent track to detect second signals from among the current track, the first adjacent track, and the second adjacent track. Analyzing the first and second signals determines an amount by which the read heads are off-track from the current track.

21 Claims, 11 Drawing Sheets

(56) References Cited

U.S. PATENT DOCUMENTS

| 9,424,880 B2 | 8/2016 | Nangare |
| 2011/0149432 A1 | 6/2011 | Coker et al. |

* cited by examiner

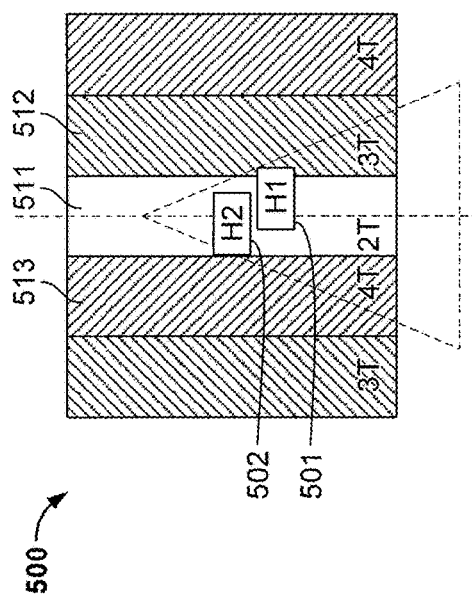
FIG. 5
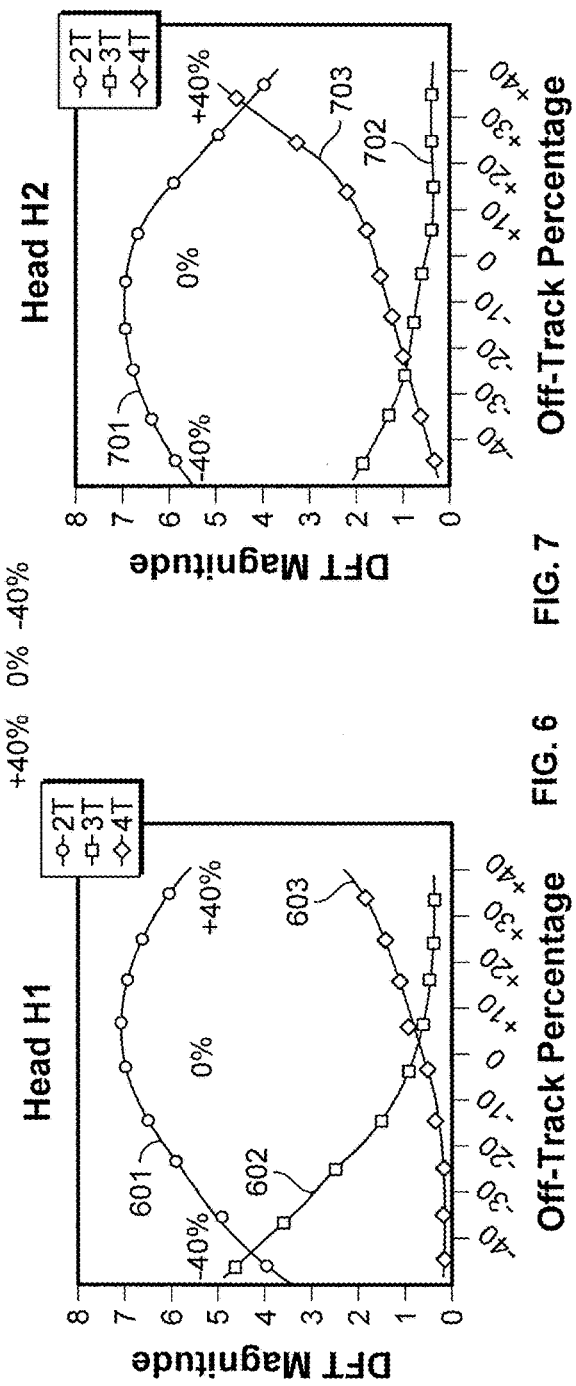
FIG. 6
FIG. 7

METHOD AND APPARATUS FOR DETERMINING READ-HEAD DEVIATION USING ORTHOGONAL PREAMBLES

CROSS REFERENCE TO RELATED APPLICATION

This claims the benefit of, commonly-assigned U.S. Provisional Patent Application No. 62/380,843, filed Aug. 29, 2016, which is hereby incorporated by reference herein in its entirety.

FIELD OF USE

This disclosure relates to data storage systems of the type in which read and write heads move over the surface of a storage medium. More particularly, this disclosure relates to determining the degree of off-track deviation of a read head, to improve read performance.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the present disclosure.

In magnetic recording, as one example, reading and writing are performed by one or more heads that move relative to the surface of a storage medium. Many magnetic disk drives, for example, include a plurality of individual disks, or "platters," which may be two-sided—i.e., each platter can store data on each of its two sides. Therefore, such a disk drive would have at least two heads for each platter. Indeed, for each platter, there is normally at least one write head and at least one separate read head, so that such a disk drive normally has at least four heads per platter.

In a common configuration, all of the heads in a given disk drive are mounted on arms attached to a common actuator that controls the radial position of the heads (an angular, tangential or circumferential component of motion is provided by the rotation of the platters relative to the heads). This is true whether there is one or many platters, and one or multiple heads per platter.

In order to control the radial position selected by the actuator, each surface of each platter has distributed upon it positional information referred to as "servo" data. The servo data are commonly distributed in spaced-apart servo "wedges" (generally spaced equiangularly) on the platter surface. By reading the servo data as each servo wedge passes under the read head, the disk drive controller can determine the precise radial and angular position of the head and can feed back that determination to control the position of the read head or the write head, depending on the required operation. Among the servo data are sync marks, which are used to determine angular position. Separate instances of the sync mark are provided at different radial positions—i.e., for different tracks.

Data on adjacent tracks may or may not be independent of one another. As areal densities for magnetic data storage continue to increase, data tracks are being written in an overlapping or "shingled" fashion—e.g., in "shingled magnetic recording" (SMR), also known as "two-dimensional magnetic recording" (TDMR)—and reading is performed using read heads or sensors having dimensions comparable to the track width. Therefore, it is important to know whether, and by how much, a read head is deviating from its nominal position relative to a track.

SUMMARY

An implementation, according to the subject matter of this disclosure, of a method of operating a storage device having a storage medium, wherein data is written to tracks on the storage medium, data for each track including a preamble, and wherein the preamble in any current track is orthogonal to the preamble in any track adjacent to the current track, includes positioning a first read head over the current track and off-center toward a first adjacent track on a first side of the current track, detecting first signals from among the current track, the first adjacent track, and a second adjacent track on a second side of the current track, positioning a second read head over the current track and off-center relative to the current track toward the second adjacent track, detecting second signals from among the current track, the first adjacent track, and the second adjacent track, and analyzing the first signals and the second signals to determine an amount by which the read heads are off-track from the current track.

A method according to such an implementation may further include using the determined amount by which the read heads are off-track from the current track to select filter taps for filtering data signals from the first read head and the second read head.

In a variant of a method according to such an implementation, the analyzing may include deriving a respective magnitude of preamble signals from the current track, the first adjacent track, and the second adjacent track.

In such a variant of a method according to such an implementation, the deriving may include applying a Discrete Fourier Transform to the preamble signals from the current track, the first adjacent track, and the second adjacent track.

In such a variant of a method according to such an implementation, the analyzing may include:

in a two-dimensional space representative, in a first dimension, of a relationship between signals from the current track and signals from the first adjacent track and, in a second dimension, of a relationship between signals from the current track and signals from the second adjacent track, computing respective distances between a point representative of positions of the first read head and the second read head and each of a plurality of respective predetermined reference points representative of an on-track position and different off-track positions;

determining a minimum respective distance among the respective distances; and declaring one of the off-track positions, represented by the respective predetermined reference point for which the respective distance is the minimum respective distance, to be the off-track position of the read heads.

An instance of that variant may further include deriving the point representative of positions of the first read head and the second read head by:

receiving from the first read head a first signal having a magnitude representing the preamble in the current track and a second signal having a magnitude representing the preamble in the first adjacent track;

receiving from the second read head a third signal having a magnitude representing the preamble in the current track and a fourth signal having a magnitude representing the preamble in the second adjacent track; and processing the first, second, third and fourth signals to derive the point representative of positions of the first read head and the second read head.

In such an instance, the processing the first, second, third and fourth signals may include applying matrix algebra techniques to the first, second, third and fourth signals.

In such an instance, the processing the first, second, third and fourth signals may include taking a ratio of the second signal to the first signal as one coordinate of the point representative of positions of the first read head and the second read head, and taking a ratio of the fourth signal to the third signal as another coordinate of the point representative of positions of the first read head and the second read head.

In an instance of that variant, the respective predetermined reference points may be derived from respective clusters of calibration samples, and the determining a minimum respective distance among the respective distances may include treating the respective clusters of calibration samples uniformly.

In an instance of that variant, the respective predetermined reference points may be derived from respective clusters of calibration samples, and the determining a minimum respective distance among the respective distances may include accounting for actual distribution of samples within each respective cluster of calibration samples.

An implementation, according to the subject matter of this disclosure, of a method of calibrating a storage device having a storage medium, wherein data is written to tracks on the storage medium, data for each track including a preamble, wherein the preamble in any current track is orthogonal to the preamble in any track adjacent to the current track, includes:

for each of (a) an on-track position, and (b) a plurality of known off-track positions:

positioning a first read head over the current track and off-center relative to the current track toward a first adjacent track on a first side of the current track, and detecting a plurality of first sample signals from among the current track, the first adjacent track, and a second adjacent track on a second side of the current track, positioning a second read head over the current track and off-center relative to the current track toward the second adjacent track, and detecting a plurality of second sample signals from among the current track, the first adjacent track, and the second adjacent track, and in a two-dimensional space representative, in a first dimension, of a relationship between signals from the current track and signals from the first adjacent track and, in a second dimension, of a relationship between signals from the current track and signals from the second adjacent track, plotting the plurality of first sample signals and the plurality of second sample signals in a cluster for a current one of (a) the on-track position, and (b) the plurality of known off-track positions; and designating a respective point in each respective cluster, each respective point being a respective reference point representative of a respective one of (a) the on-track position, and (b) one of the plurality of known off-track positions.

An implementation of a storage device according to the subject matter of this disclosure includes read circuitry having:

a first read head positioned over a current track of a storage medium and positioned off-center relative to the current track toward a first adjacent track on a first side of the current track, data on each track including a preamble including a repeating pattern, wherein the repeating pattern in any current track is orthogonal to the repeating pattern in any track adjacent to the current track, the first read head detecting first signals from among the current track, the first adjacent track, and a second adjacent track on a second side of the current track;

a second read head positioned over the current track and off-center relative to the current track toward the second adjacent track, and detecting second signals from among the current track, the first adjacent track, and the second adjacent track; and circuitry for analyzing the first signals and the second signals to determine an amount by which the read heads are off-track from the current track.

A variant of such an implementation of a storage device may further include a filter for filtering the first signals and the second signals, and memory for storing filter taps for the filter, wherein the circuitry for analyzing uses the determined amount by which the read heads are off-track from the current track to select filter taps for the filter from the memory.

In a variant of such an implementation of a storage device, the circuitry for analyzing may derive a respective magnitude of preamble signals from the current track, the first adjacent track, and the second adjacent track.

An instance of such a variant of a storage device, the circuitry for analyzing may further include Discrete Fourier Transform circuitry configured to derive the respective magnitude of preamble signals from the current track, the first adjacent track, and the second adjacent track.

In such an instance of a storage device:

the circuitry for analyzing may compute, in a two-dimensional space representative, in a first dimension, of a relationship between signals from the current track and signals from the first adjacent track and, in a second dimension, of a relationship between signals from the current track and signals from the second adjacent track, respective distances between a point representative of positions of the first read head and the second read head and each of a plurality of respective predetermined reference points representative of an on-track position and different off-track positions;

the circuitry for analyzing may determine a minimum respective distance among the respective distances; and the circuitry for analyzing may declare one of the off-track positions, represented by the respective predetermined reference point for which the respective distance is the minimum respective distance, to be the off-track position of the read heads.

In that instance of a storage device, the circuitry for analyzing may derive the point representative of positions of the first read head and the second read head by:

receiving from the first read head a first signal having a magnitude representing the preamble in the current track and a second signal having a magnitude representing the preamble in the first adjacent track;

receiving from the second read head a third signal having a magnitude representing the preamble in the current track and a fourth signal having a magnitude representing the preamble in the second adjacent track; and processing the first, second, third and fourth signals to derive the point representative of positions of the first read head and the second read head.

In such a case, the circuitry for analyzing may process the first, second, third and fourth signals by applying matrix algebra techniques to the first, second, third and fourth signals.

Alternatively in such a case, the circuitry for analyzing may processes the first, second, third and fourth signals by taking a ratio of the second signal to the first signal as one coordinate of the point representative of positions of the first read head and the second read head, and taking a ratio of the fourth signal to the third signal as another coordinate of the point representative of positions of the first read head and the second read head.

In the aforementioned instance of such a storage device, the respective predetermined reference points may be derived from respective clusters of calibration samples, and the circuitry for analyzing treats the respective clusters of calibration samples uniformly when determining a minimum respective distance among the respective distances.

In the aforementioned instance of such a storage device, the respective predetermined reference points may be derived from respective clusters of calibration samples, and the circuitry for analyzing may account for actual distribution of samples within each respective cluster of calibration samples when determining a minimum respective distance among the respective distances.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which:

FIG. 5 shows an arrangement of three tracks having three orthogonal preamble patterns, with two read heads arranged relative to those tracks;

FIG. 6 is a graphical representation of the outputs of one of the two read heads of FIG. 5;

FIG. 7 is a graphical representation of the outputs of another of the two read heads of FIG. 5;

DETAILED DESCRIPTION

Figure 1:
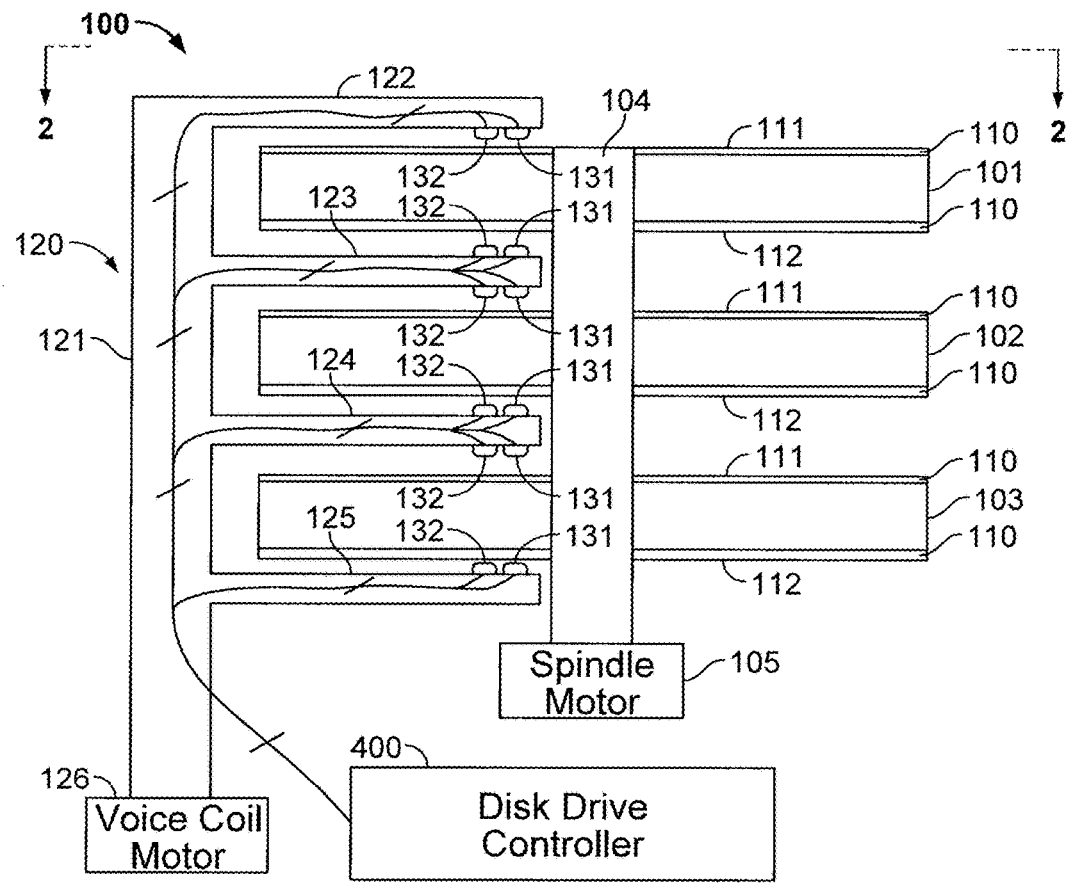
FIG. 1 is a side elevational view of a portion of a disk drive with which the present disclosure may be used.
Figure 2:
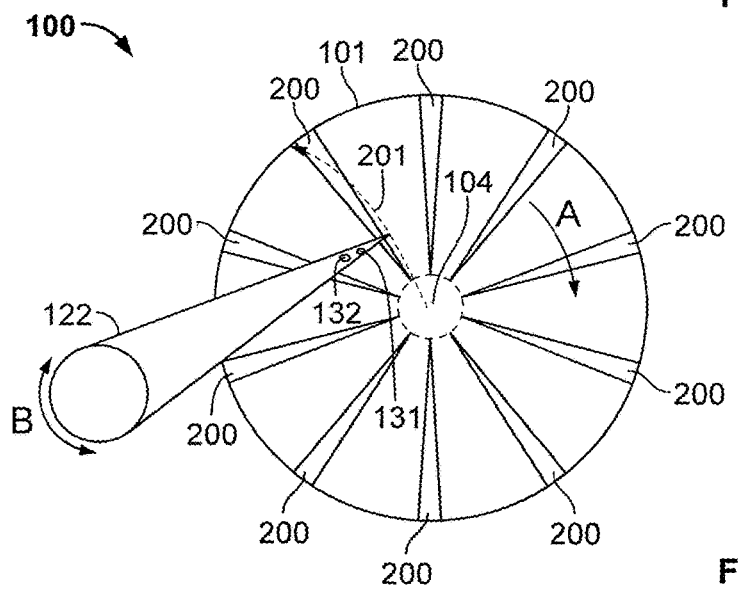
FIG. 2 is a plan view of the disk drive portion of FIG. 1, taken from line 2-2 of FIG. 1.

FIGS. 1 and 2 show an example of a disk drive 100 with which the present disclosure may be used. In this particular example, disk drive 100 has three platters 101, 102, 103, although any number of platters may be included in a disk drive with which the present disclosure may be used. As shown, each platter 101, 102, 103 has, on each of its upper and lower surfaces 111, 112, a coating 110 made from a material in which data can be stored, e.g., magnetically. The present disclosure also is relevant to a disk drive in which one or more platters includes coating 110 on only one of its surfaces, but such a disk drive would store less data in the same volume than a disk drive with two-sided platters. The platters 101-103 are mounted on a rotatable spindle 104. Motor 105 rotates spindle 104 to rotate platters 101-103, for example, in the direction of arrow A (FIG. 2). Although motor 105 is shown connected directly to spindle 104, in some cases motor 105 may be located off-axis of spindle 104 and would be connected to spindle 104 through belts or gears (not shown).

Read/write head assembly 120 includes an actuator 121 that bears arms 122-125, one of which is disposed adjacent to each surface 111, 112 of a platter 101, 102, 103 that has a memory storage coating 110. In this example, with heads on both surfaces of each of arms 123, 124, that amounts to four arms 122-125, but in the single-sided platter example discussed above, there would be only three arms. In other examples, the number of arms would increase or decrease along with the number of platters.

Each arm 122-125 bears, at or near its end furthest from actuator 121, and on both its upper and lower surfaces in the case of arms 123, 124, a plurality of read heads/sensors and write heads. In this case, two sensors 131, 132 are shown, and will be used to represent read sensors, although it would normally at least be expected that each set of one or more read sensors has a companion write head (not shown). It should be noted that FIGS. 1 and 2 are schematic only and not to scale. For example, the spindle diameter may be larger by comparison to the disk diameter.

A motor 126, commonly referred to as a "voice-coil motor," rotates actuator 121 back and forth, for example, along the directions of arrow B (FIG. 2) to move the heads 131, 132 along the path indicated by dashed arrow 201, although arms 122-125 normally cannot point directly at the center of the disk. The motion of actuator 121 thus changes both the radial and circumferential positions of heads 131, 132, but the circumferential positional change is relatively unimportant insofar as the platters are rotating. The motion of actuator 121 thus is used to control the radial position of heads 131, 132.

The location on surface 111 of platter 101 (the other surfaces are similar) of the aforementioned wedges is shown in FIG. 2. Each servo wedge 200 includes data identifying it by wedge, or sector, number (to give an angular, tangential or circumferential position) and by data representing, at each point along a radius of the platter, the distance from spindle 104, although sometimes some of this information is omitted from some of the wedges.

As noted above, as areal densities for magnetic data storage continue to increase, data tracks are being written in an overlapping or "shingled" fashion—e.g., in "two-dimensional magnetic recording" (TDMR)—and reading is being performed using read heads or sensors having dimensions comparable to the track width. Therefore, it is important to know whether, and by how much, a read head is deviating from its nominal position relative to a track. If an off-track condition is detected, system parameters can be optimized for better performance based on the amount by which the heads are off-track. For example, filter parameters, as well as the amount of gain for each head, can be adjusted based on the amount by which the heads are off-track.

In accordance with implementations of this disclosure, adjacent tracks may be written with orthogonal preambles—i.e., preambles that are mutually exclusive, such as those described in commonly-assigned U.S. Pat. No. 9,153,264, which is hereby incorporated by reference herein in its entirety. Specifically, the preambles may be chosen to be a pair of periodic patterns such that the inner product of the two patterns in question, when represented as sequences of write current polarities {−1,1}, over a window chosen to contain an integer number of periods of both patterns, is zero. For example, a 2T pattern (110011001100 . . . ) may be written to the preambles on each even-numbered track, while a 3T pattern (111000111000111000 . . . ) may be written to the preambles on each odd-numbered track, although any pair of periods where one period is not a multiple of the other may be selected. There may be other patterns as well, such as a 4T pattern (1111000011110000111110000 . . . ). Any pair of such orthogonal patterns may be used for adjacent tracks in accordance with this disclosure. These patterns may be described in terms of tones (i.e., sinusoidal signals at the fundamental frequencies of the respective patterns).

Figure 3:
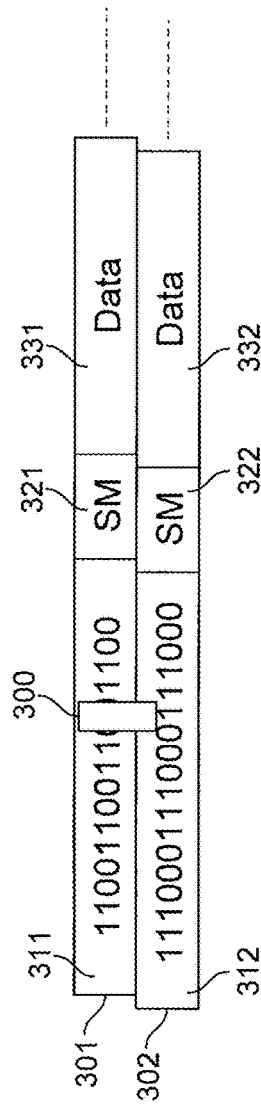
FIG. 3 is a schematic representation of an example of adjacent data tracks with an off-track read head.

A pair of tracks 301, 302 with orthogonal preambles 311, 312 as described above is shown in FIG. 3. Although tracks 301, 302 are shown as being straight, in the case of a rotating medium such as a disk drive platter, tracks 301, 302 actually would be curved. FIG. 3 also shows a read head 300 which is in an off-track condition; although read head 300 nominally should be aligned with track 301, read head 300 as shown is mainly over track 301, but is partially over track 302 as well. The portions of tracks 301, 302 that are shown would be outside the servo wedges 200—i.e., preambles 311, 312 are interspersed among the user data outside the servo wedges 200 (e.g., at the beginnings of at least some data packets). Normally, each preamble is followed by one of sync marks 321, 322. However, in some cases, extra preambles may be inserted without sync marks.

Figure 4:
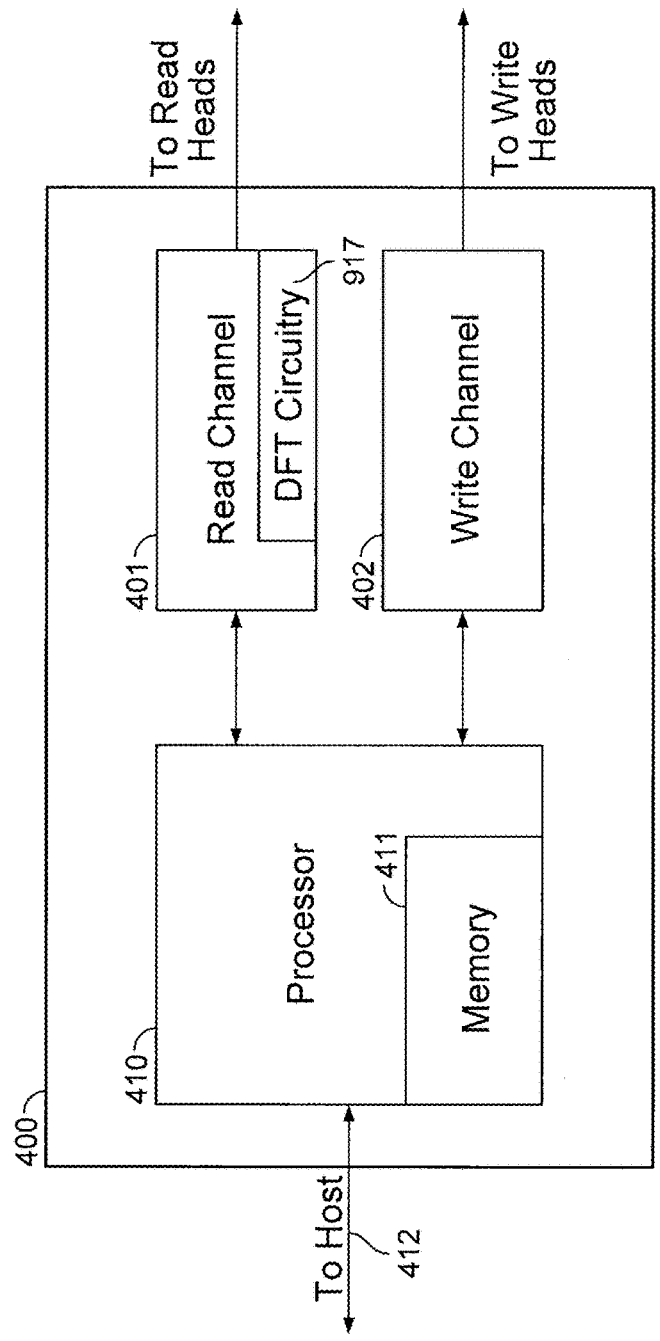
FIG. 4 is a schematic representation of a controller for the drive of FIGS. 1 and 2.

Read head 300 is coupled to a read channel 401 of a hard drive controller 400 (FIG. 4). In addition, an unseen write head is coupled to a write channel 402 of hard drive controller 400. Hard drive controller 400 also includes a processor 410 and a memory 411, as well as a connection 412 to a host processor (not shown). Memory 411 may be used to store the position error signal (PES) data that indicates the track position offsets. A servo control loop in hard drive controller 400 uses the PES data to keep read head 300 (as well as the unseen write head) on track.

Commonly-assigned U.S. Pat. No. 9,424,880, which is hereby incorporated by reference herein in its entirety, describes using Discrete Fourier Transforms to measure the tones in the preambles of two adjacent tracks to determine a ratio representing off-track condition.

FIG. 5 shows an arrangement 500 of tracks having preambles with 2T, 3T and 4T patterns. Two read heads H1 (501) and H2 (502) are positioned above track 511, which, in this example, has preambles with a 2T pattern. Read head H1 (501) has a nominal position toward track 512 which has preambles with a 3T pattern, while read head H2 (502) has a nominal position toward track 513 which has preambles with a 4T pattern.

FIGS. 6 and 7 show the outputs of the two read heads. As seen in FIG. 6, when read head H1 (501) is in its nominal position over track 511 (0% off-track), it has a high 2T output 601 and almost no 3T or 4T outputs 602, 603. As read head H1 (501) moves in the negative off-track direction toward track 512, the 4T signal contribution 603 remains negligible, while the 2T signal contribution 601 decreases and the 3T signal contribution 602 increases, to the point that the 3T signal contribution 602 may exceed the 2T signal contribution 601 at −40% displacement toward track 512. Similarly, as read head H1 (501) moves in the positive off-track direction toward track 513, the 3T signal contribution 602 remains negligible, while the 2T signal contribution 601 decreases and the 4T signal contribution 603 increases, but in this example, in this direction, because the nominal position of read head H1 (501) is closer to track 512, at +40% displacement toward track 513, the 2T signal contribution 601 remains higher than the 4T signal contribution 603.

As seen in FIG. 7, when read head H2 (502) is in its nominal position over track 511 (0% off-track), it has a high 2T output 701 and almost no 3T or 4T outputs 702, 703. As read head H2 (502) moves in the positive off-track direction toward track 513, the 3T signal contribution 702 remains negligible, while the 2T signal contribution 701 decreases and the 4T signal contribution 703 increases, to the point that the 4T signal contribution 703 may exceed the 2T signal contribution 701 at +40% displacement toward track 513. Similarly, as read head H2 (502) moves in the negative off-track direction toward track 512, the 4T signal contribution 703 remains negligible, while the 2T signal contribution 701 decreases and the 3T signal contribution 702 increases, but in this example, in this direction, because the nominal position of read head H2 (502) is closer to track 513, at −40% displacement toward track 512, the 2T signal contribution 701 remains higher than the 3T signal contribution 702.

Although FIGS. 5-7 show an example in which three preamble patterns are used, the same principles apply if only two alternating preamble patterns (e.g., 2T, 3T, 2T, 3T, etc., or 3T, 4T, 3T, 4T, etc.) are used. For example, in the alternating 2T/3T case, the graphs in FIGS. 6 and 7 would show contributions from a 2T signal and two 3T signals (which could be labelled, e.g., $3T_{right}$ and $3T_{left}$). More generally, one can consider three signals $T_{center}/T_{right}$ and $T_{left}$, which can be abbreviated $T_c$, $T_r$ and $T_l$.

A disk can be calibrated by purposely placing the read heads H1 (501) and H2 (502) at an on-track position and known off-track positions and taking multiple samples at each position. The samples can be plotted in a two-dimensional space representing ratios of magnitudes of preamble signal contributions from the right and left tracks ($T_r$ and $T_l$) to the magnitude of the preamble signal contribution from the center track ($T_c$). The ratio $m_{Tr}/m_{Tc}$ of the magnitude of the preamble signal contribution from the right track ($T_r$) to the magnitude of the preamble signal contribution from the center track ($T_c$) would be one axis of the two-dimensional space, while the ratio $m_{T_l}/m_{T_c}$ of the magnitude of the preamble signal contribution from the left track ($T_l$) to the magnitude of the preamble signal contribution from the center track ($T_c$) would be another axis of the two-dimensional space. Different clusters of samples would represent different off-track and on-track (i.e., 0% off-track) positions. This is performed for each track of the disk. During actual operation, a similar sample would be taken and, depending on which cluster that sample fell in in the two-dimensional plot for the track in question, would indicate the degree to which the read heads are off-track.

One way of determining which cluster such an actual operational sample belonged to may be determined by finding a minimum distance from the sample, plotted in the same two-dimensional space as the calibration samples, to a representative point within each cluster, which may, for example, be the geometric center of each cluster. The determination of the minimum distance could be a simple Euclidean computation, or something more complicated, as described below.

The discussion below assumes 2T/3T/4T patterns as shown in FIG. 5, but that assumption is only for illustrative purposes. Any two-pattern or three-pattern arrangement can be used, as long as the various patterns are orthogonal to each other, including, e.g., 2T/3T, 3T/4T, and also 2T/4T (any harmonics resulting from a 2T/4T pattern have been found to be negligible).

A two-dimensional plot 800 as described above, for a 2T/3T/4T case, is shown in FIG. 8. In this case, samples were taken for nine head positions—on-track, and off-track by 10%, 20%, 30% and 40% in each direction. Each head position resulted in a cluster 801, 802, 803, 804, 805, 806, 807, 808 or 809 of points, where each point represents a pair of signal ratios. The abscissa 810 represents the ratio of signals from read head H1 (501), $r_1=m_{3T}/m_{2T}$, while the ordinate 820 represents the ratio of signals from read head H1 (501), $r_2=m_{4T}/m_{2T}$. A respective point 811, 812, 813, 814, 815, 816, 817, 818 and 819 may be selected as a representative point for each cluster, to which actual data points may be compared as discussed below.

The dashed lines 821, 822, 823, 824, 825, 826, 827 and 828 represent boundaries between clusters and therefore between degrees (in this example, from −40% to +40% in 10% increments) to which the read heads 501, 502 are on-track or off-track. An actual data point is said to indicate that the read heads are on-track or off-track to that degree based on which of representative points 811, 812, 813, 814, 815, 816, 817, 818 and 819 it is closest to. Several variants are discussed below for determining the minimum distance from a data point to one of representative points 811, 812, 813, 814, 815, 816, 817, 818 and 819.

Figure 9:
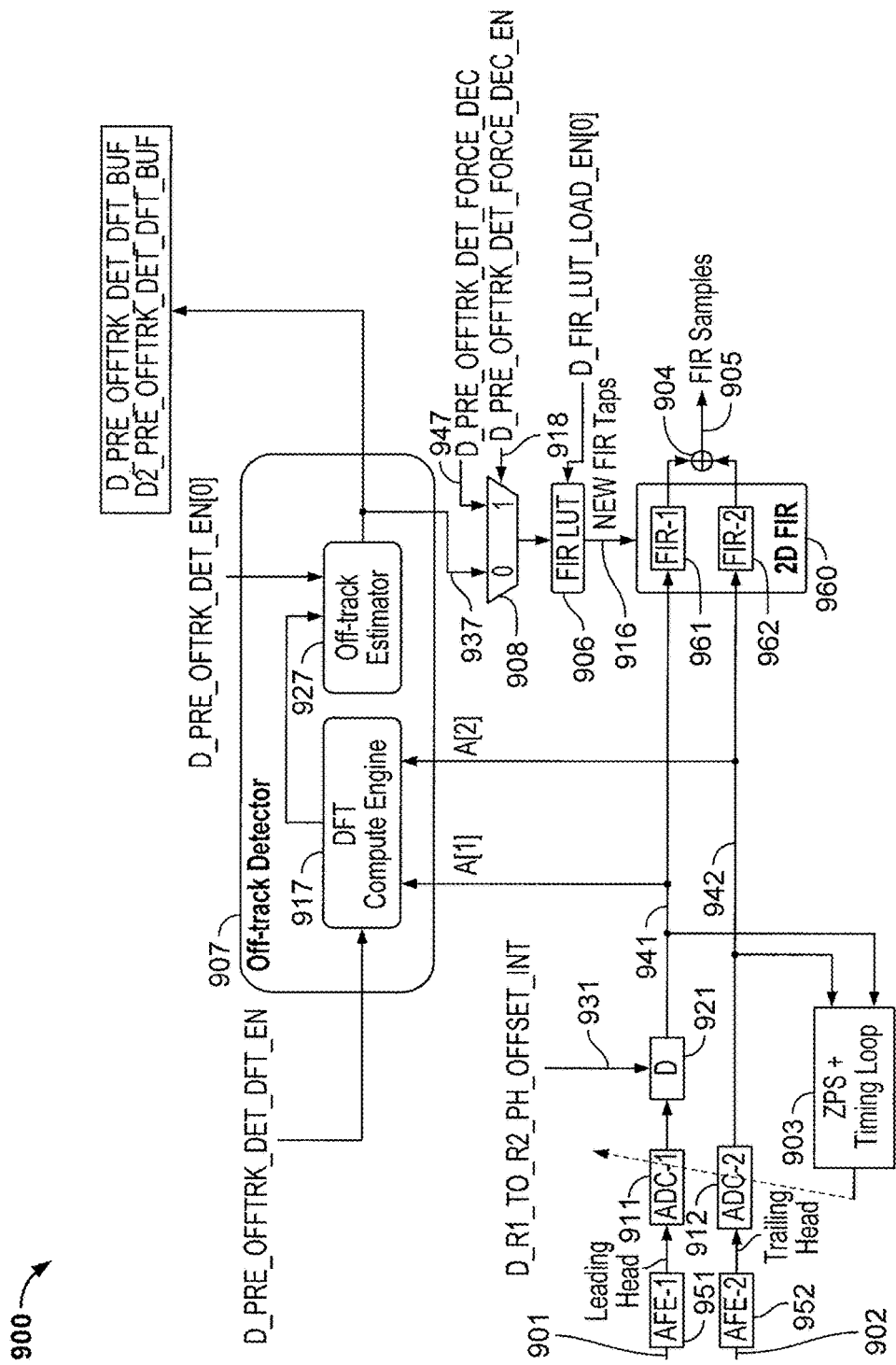
FIG. 9 is a schematic representation of circuitry in the read channel of a disk drive according to an implementation of the subject matter of this disclosure.

FIG. 9 is a schematic representation of circuitry 900 in the read channel of a disk drive for processing signals from read heads 501, 502, including off-track detection circuitry 950. Signals 901, 902 from read heads 501, 502, respectively, are input to respective analog front ends (AFEs) 951, 952, and then to respective analog-to-digital converters 911, 912.

In the orientation shown in FIG. 5, read heads 501, 502 move down relative to the disk storage medium (although it is actually the disk storage medium that moves in the other direction). Because read head H1 (501) is ahead of read head H2 (502), the output of analog-to-digital converter 911 is passes through delay line 921 to give the signal from read head H2 (502), as output by analog-to-digital converter 912, time to catch up to the signal from read head H1 (501), so that both signals represent the same location on the disk storage medium. The amount of delay introduced by delay line 921 may be programmable to account, for example, for different speeds at which the disk storage medium may rotate, or for temperature-induced variations in the distance between the two read heads 501, 502. Where such a variable delay line 921 is provided, the delay may be programmed by inputting the delay value at 931. Zero-phase-start (ZPS) timing loop 903 controls the sampling times of analog-to-digital converters 911, 912, so that both analog-to-digital converters 911, 912 sample their respective signals at the same phase (notwithstanding the delay separately introduced after sampling by delay line 921).

Sampled (and delayed in the case of signal 941) signals 941, 942 are filtered by, e.g., a two-dimensional finite impulse response (FIR) filter 960, including respective FIR filters 961, 962, which are added at 904 to provide a set FIR samples 905 to be decoded. The filter taps 916 for FIR filters 961, 962 are loaded from a look-up table (FIR LUT) 906 based on the off-track information 937 derived from signals 941, 942 by off-track detector circuitry 907, which includes Discrete Fourier Transform (DFT) compute engine 917 and Off-Track Estimator 927. The output 937 of off-track detector circuitry 907 is normally selected by multiplexer 908 to control selection of filter taps 916. Alternatively, by asserting control signal 918, a user can input—either manually, or as the output of other circuitry (not shown)—a particular LUT selection signal 947 to select the filter taps 916.

Figure 10:
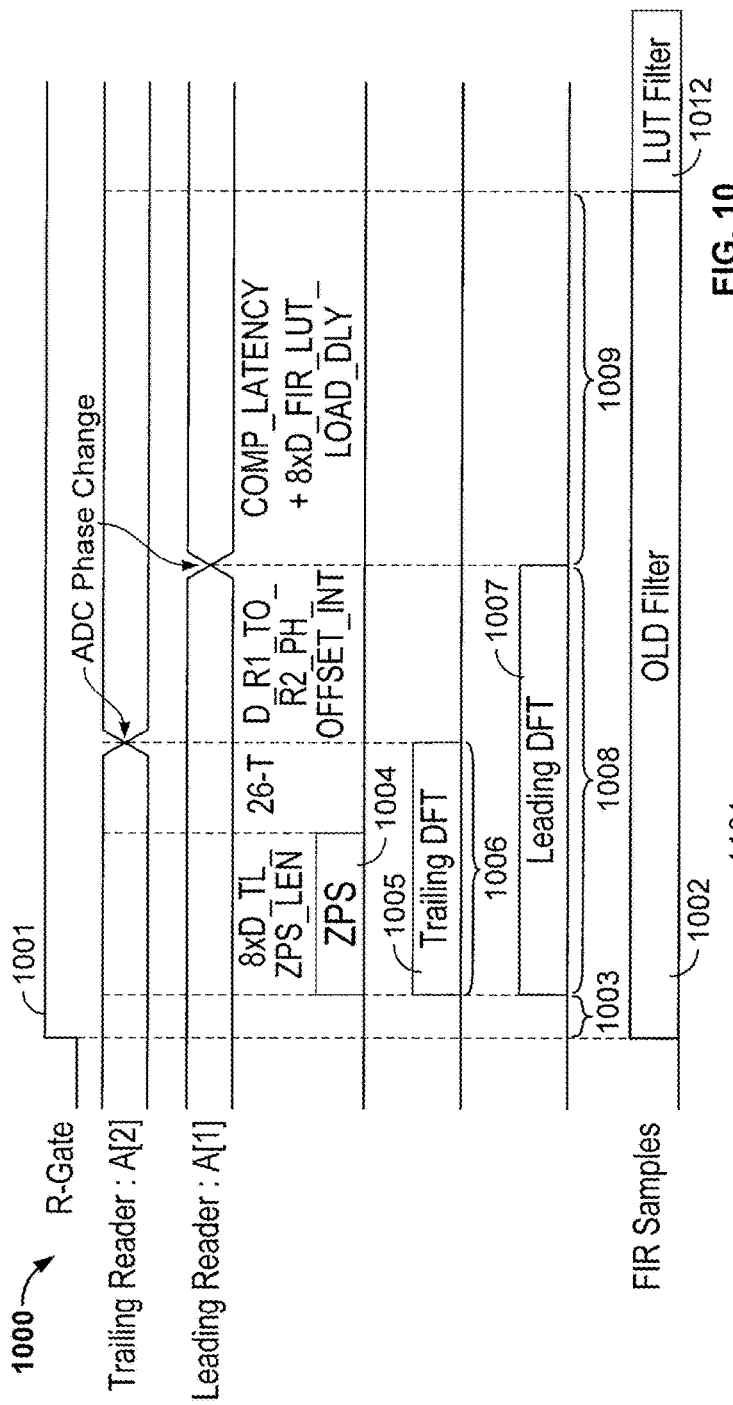
FIG. 10 is a timing diagram of the operation of the circuitry of FIG. 9 according to an implementation of the subject matter of this disclosure.

The timing 1000 of the operation of the circuitry in FIG. 9 is shown in FIG. 10. A Read operation begins with the assertion of R-Gate signal 1001, at which time a previous selection of FIR filter taps 1002 are in effect. After a defined interval 1003, which may be programmed by the user, ZPS timing loop 903 sends a signal 1004 setting the sampling phase. At the same time, DFT computations begin in DFT compute engine 917 on samples from each of read heads 501, 502 from analog-to-digital converters 911, 912. DFT computation 1005 for trailing read head H2 (502) continues for a predetermined interval 1006 following timing signal 1004, while DFT computation 1007 for leading read head H1 (501) continues for a longer interval 1008 to compensate for the delay introduced by delay line 921. The previous FIR filter taps 1002 remain in effect during those time intervals, and during a further interval 1009 (related to computation latency) following completion of DFT computation 1007 for leading read head H1 (501), to allow for loading of new FIR filter taps 1012. Following the end of interval 1009, further samples are processed using FIR filter taps 1012.

Figure 8:
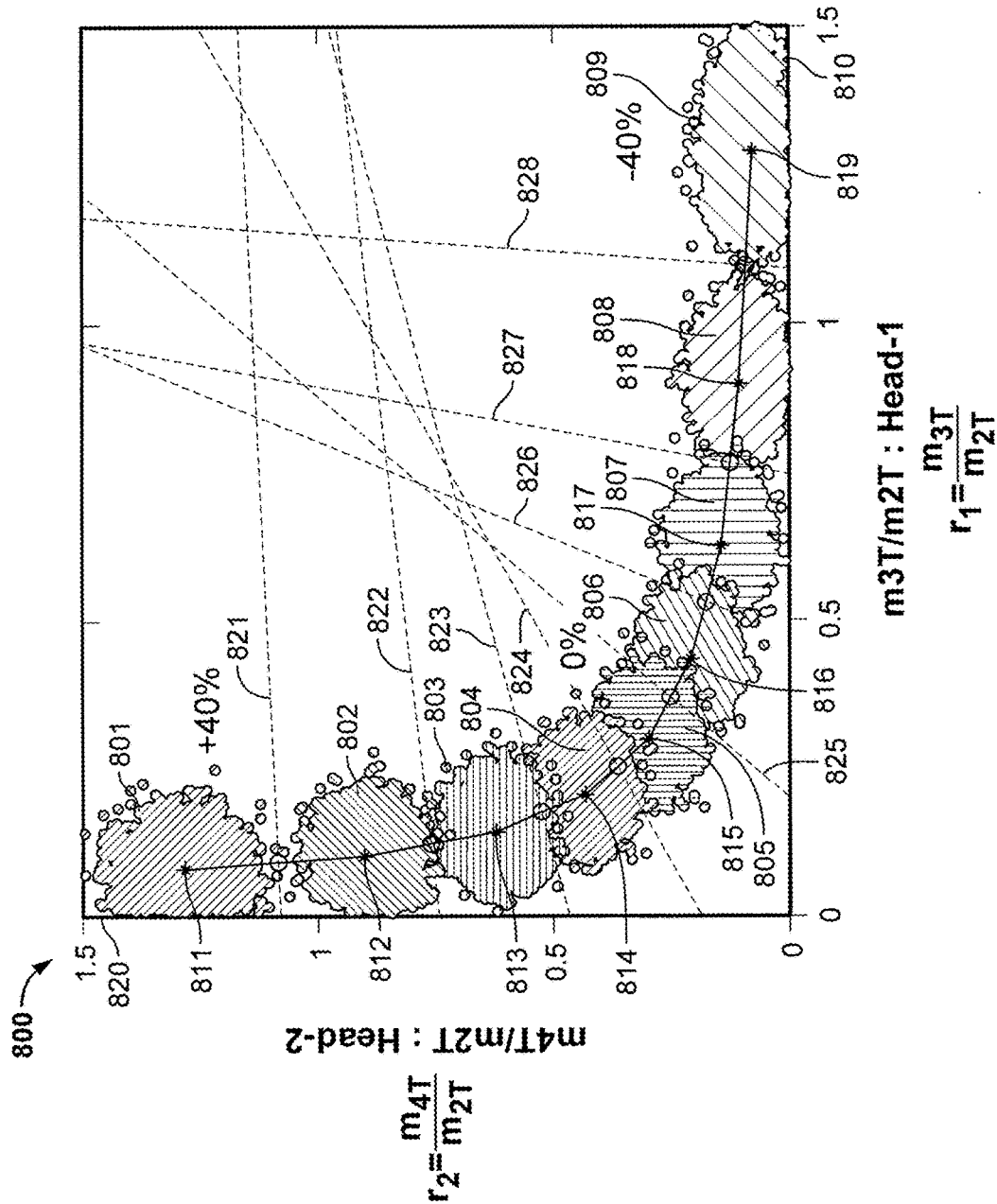
FIG. 8 is a two-dimensional plot of calibration samples according to an implementation of the subject matter of this disclosure.

Off-Track Estimator 927 operates as a "maximum likelihood" detector, computing the minimum distance in the two-dimensional space of FIG. 8 from a data sample, determined by DFT Compute Engine 917, to one of the calibrated reference parameters (i.e., one of representative points 811, 812, 813, 814, 815, 816, 817, 818, 819), as discussed above. The subject matter of this disclosure encompasses at least two implementations of a maximum likelihood detector.

In a first implementation of a maximum likelihood detector according to the subject matter of this disclosure, ratios are computed in a manner similar to that described above in connection with FIG. 8, and those ratios are processed to determine the minimum distance to one of the calibrated reference parameters, which determines the degree to which the read heads in question are off-track.

In order to understand the operation of such an implementation, it should be recognized that the clusters 801, 802, 803, 804, 805, 806, 807, 808, 809 of calibration data points are not identical in shape, which affects the accuracy of the boundaries 821, 822, 823, 824, 825, 826, 827 and 828.

Therefore, the minimum distance determination is probabilistic—i.e., a determination that a measured point is closer to a first reference point than to a second reference point reflects a greater probability that the off-track position is the one associated with the first reference point than that the off-track position is the one associated with the second reference point.

Figure 11:
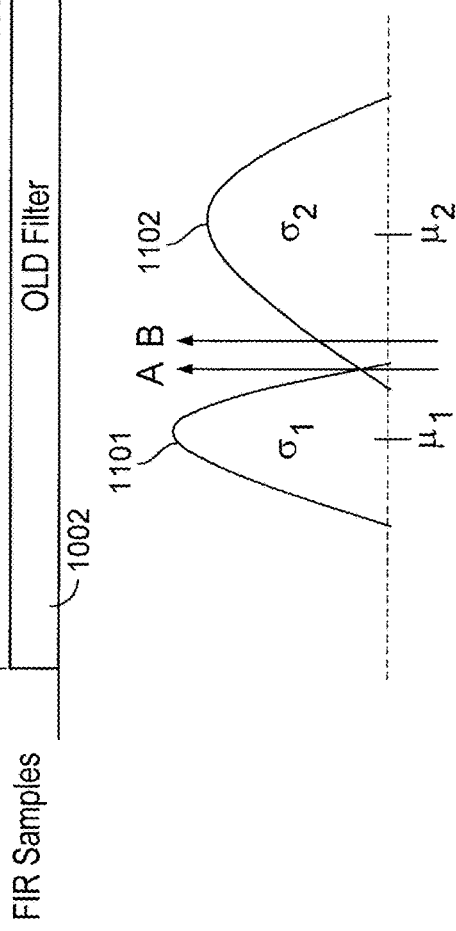
FIG. 11 is a graphical representation of an example of probability distributions in two clusters of calibration samples in a plot such as that of FIG. 8.

Referring to FIG. 11, if a first cluster 1101 has a distribution $\sigma_1$ with a center point $\mu_1$, and a second cluster 1102 has a distribution $\sigma_2$ with a center point $\mu_2$, then assuming that the off-track probability $p_1$ represented by first cluster 1101 is:

$$p_1 = (2\pi\sigma_1^2)^{-0.5} e^{-(r-\mu_1)^2/(2\sigma_1^2)}$$

and that the off-track probability $p_2$ represented by second cluster 1102 is:

$$p_2 = (2\pi\sigma_2^2)^{-0.5} e^{-(r-\mu_2)^2/(2\sigma_2^2)},$$

then placing the boundary at the intersection A of the two distributions $\sigma_1$ and $\sigma_2$ means that off-track probability $p_1$ is more likely than off-track probability $p_2$ if:

$$\sigma_1^2(r-\mu_1)^2 - \sigma_2^2(r-\mu_2)^2 > 2\sigma_1^2\sigma_2^2 \ln(\sigma_1/\sigma_2)$$

However, an assumption that the boundary is located at B, halfway between the center points $\mu_1$ and $\mu_2$, is accurate only when $\sigma_1=\sigma_2$—i.e., when the distributions are identical.

Thus, in a first variant of a first implementation using ratios, the probability p(r/i) that for track r, the degree to which the heads are off-track is i (where i=1 to 9, representing off-track conditions from −40% to +40%) is:

$$p(r/i) = ((2\pi)^k |C_i|) e^{-(r-\mu_i)^T C_i^{-1} (r-\mu_i)},$$

where:

$$r = \begin{bmatrix} r_1 \\ r_2 \end{bmatrix}$$

and $$\mu_i = \begin{bmatrix} \mu_{i,1} \\ \mu_{i,2} \end{bmatrix}$$

and $C_i$ is the covariance matrix that accounts for the accurate shape of each distribution $\sigma_i$:

$$C_i = E[(r-\mu_i)(r-\mu_i)^T] = \begin{bmatrix} C_{i,11} & C_{i,12} \\ C_{i,21} & C_{i,22} \end{bmatrix}.$$

Therefore, $\hat{i}$, the degree to which the heads are off-track, may be given by:

$$\hat{i} = \min_i (\ln(|C_i|) + (r-\mu_i)^T C_i^{-1} (r-\mu_i))$$

Figure 12:
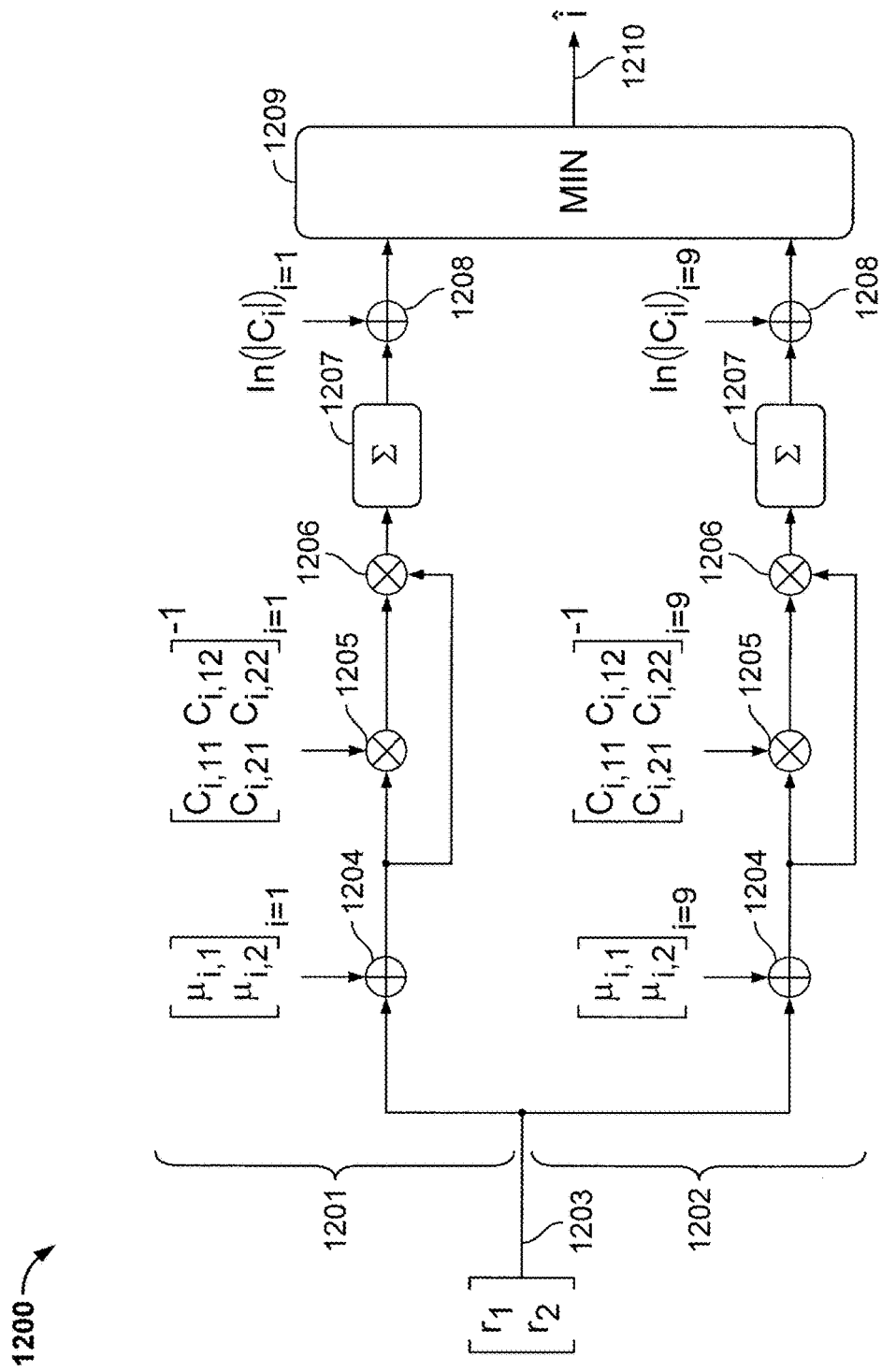
FIG. 12 is a schematic representation of a maximum likelihood detector circuit according to a first variant of a ratio-based implementation of the subject matter of this disclosure.

A maximum likelihood detector circuit 1200 for determining $\hat{i}$ according to this variant of a ratio-based implementation of the subject matter of this disclosure is shown in FIG. 12. Although FIG. 12 shows two paths 1201, 1202 for computing the i=1 case and the i=9 case, additional paths for i=2 through i=7 cases also are present. r is input to all paths 1201, 1202 at 1203. $\mu_i$ is input to respective adder/subtractor 1204 which computes r−$\mu_i$. The respective inverse matrix $C^{-1}_i$ is input to respective multiplier 1205, which computes $(r-\mu_i)^T C_i^{-1}$ including the transposition of r−$\mu_i$. Each of those results is then multiplied by r−$\mu_i$ at respective multiplier 1206. The multiplications are matrix multiplications and in this implementation, respective multipliers 1205, 1206 multiply one element at a time and the results are accumulated in respective accumulators 1207. Respective adder 1208 adds in the natural logarithm of the determinant of the respective matrix $C_i$. The same occurs in every path 1201, 1202 and the minimum of all paths is determined at 1209, yielding $\hat{i}$ at 1210.

A second variant of a ratio-based implementation assumes that the clusters are identical (i.e., $\sigma_1=\sigma_2=\sigma$). It can then be shown that the covariance matrix $C_i$ reduces to:

$$C_i = E[(r-\mu_i)(r-\mu_i)^T] = \begin{bmatrix} \sigma^2 & 0 \\ 0 & \sigma^2 \end{bmatrix}$$

so that $\hat{i}$ reduces to:

$$\hat{i} = \min_i ((r_1 - \mu_{i,1})^2 + (r_2 - \mu_{i,2})^2)$$

which in matrix form is merely $$\hat{i} = \min_i ((r - \mu_i)^2).$$

Figure 13:
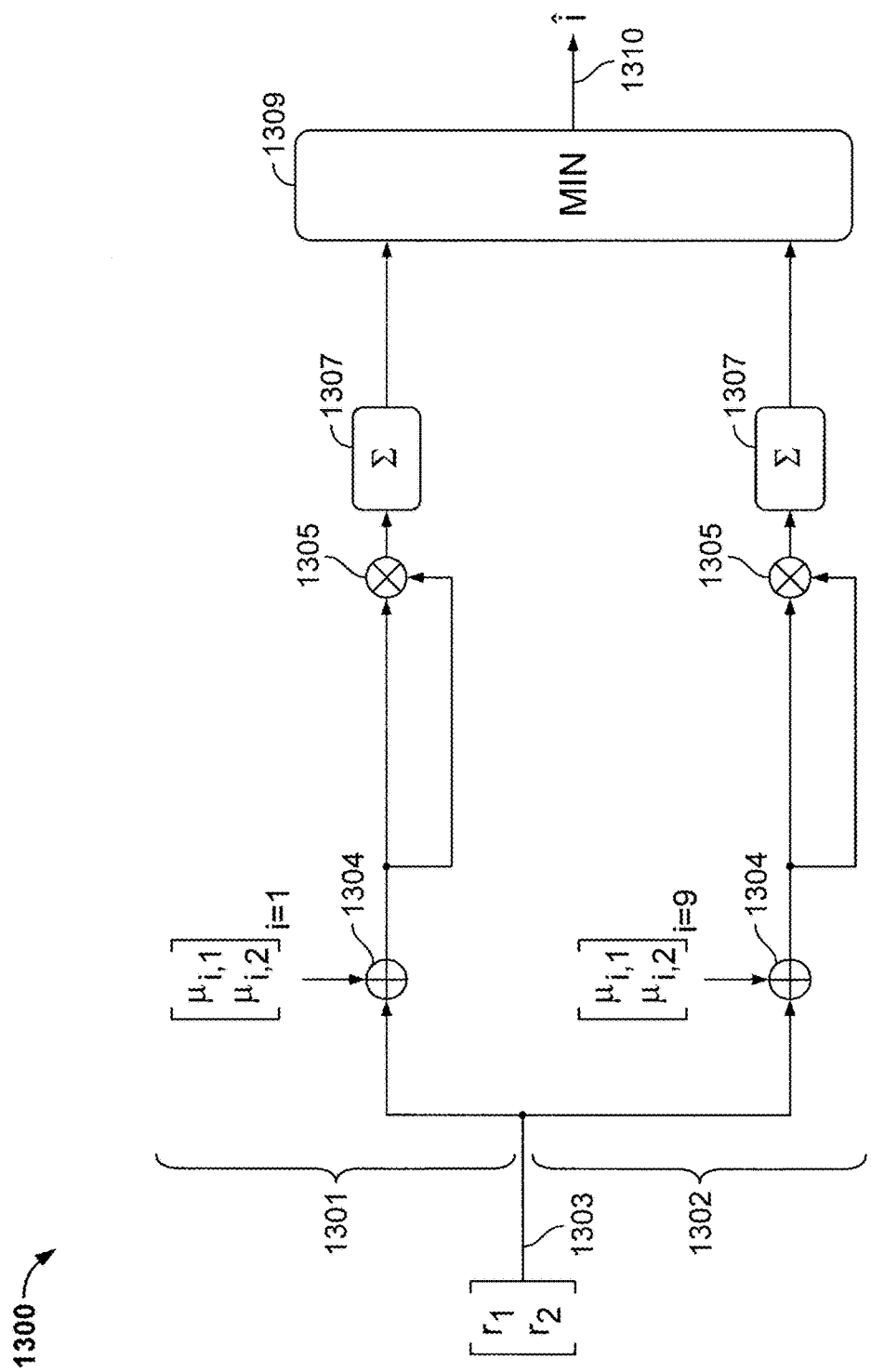
FIG. 13 is a schematic representation of a maximum likelihood detector circuit according to a second variant of a ratio-based implementation of the subject matter of this disclosure.

A maximum likelihood detector circuit 1300 for determining $\hat{i}$ according to this variant of a ratio-based implementation of the subject matter of this disclosure is shown in FIG. 13. Although FIG. 13 shows two paths 1301, 1302 for computing the i=1 case and the i=9 case, additional paths for i=2 through i=7 cases also are present. r is input to all paths 1301, 1302 at 1303. $\mu_i$ is input to respective adder/subtractor 1304 which computes r−$\mu_i$. r−$\mu_i$ is multiplied by itself at respective multiplier 1305 to yield $(r-\mu_i)^2$. The multiplications are matrix multiplications and in this implementation, each of respective multipliers 1305 multiplies one element at a time and the results are accumulated in respective accumulators 1307. The same occurs in every path 1301, 1302 and the minimum of all paths is determined at 1309, yielding $\hat{i}$ at 1310.

Circuit 1300 thus includes fewer components than circuit 1200, but is less accurate for the reasons discussed in connection with FIG. 11, because the distributions $\sigma_1$ and $\sigma_2$ are usually not identical.

In a second implementation of a maximum likelihood detector according to the subject matter of this disclosure, the minimum distance to one of the calibrated reference parameters, which determines the degree to which the read heads in question are off-track, is determined directly from the individual DFT magnitudes, rather than from ratios of those magnitudes. This requires larger matrix calculations.

In such an implementation, the probability p(x/i) that for track x, the degree to which the heads are off-track is i is:

$$p(x/i) = \frac{1}{\sqrt{(2\pi)^k |C_i|}} e^{-\frac{(x-\mu_i)^T C_i^{-1}(x-\mu_i)}{2}}$$

where x is a matrix of the individual magnitudes rather than the ratios of those magnitudes:

$$x = \begin{bmatrix} x_1 \\ x_2 \\ x_3 \\ x_4 \end{bmatrix}$$

and $$\mu_i = \begin{bmatrix} \mu_{i,1} \\ \mu_{i,2} \\ \mu_{i,3} \\ \mu_{i,4} \end{bmatrix}$$

and:

$$C_i = E[(x-\mu_i)(x-\mu_i)^T] = \begin{bmatrix} C_{i,11} & C_{i,12} & C_{i,13} & C_{i,14} \\ C_{i,21} & C_{i,22} & C_{i,23} & C_{i,24} \\ C_{i,31} & C_{i,32} & C_{i,33} & C_{i,34} \\ C_{i,41} & C_{i,42} & C_{i,43} & C_{i,44} \end{bmatrix}$$

Therefore, $\hat{i}$, the degree to which the heads are off-track, may be given by:

$$\hat{i} = \min_i (\ln(|C_i|) + (x-\mu_i)^T C_i^{-1}(x-\mu_i)).$$

Figure 14:
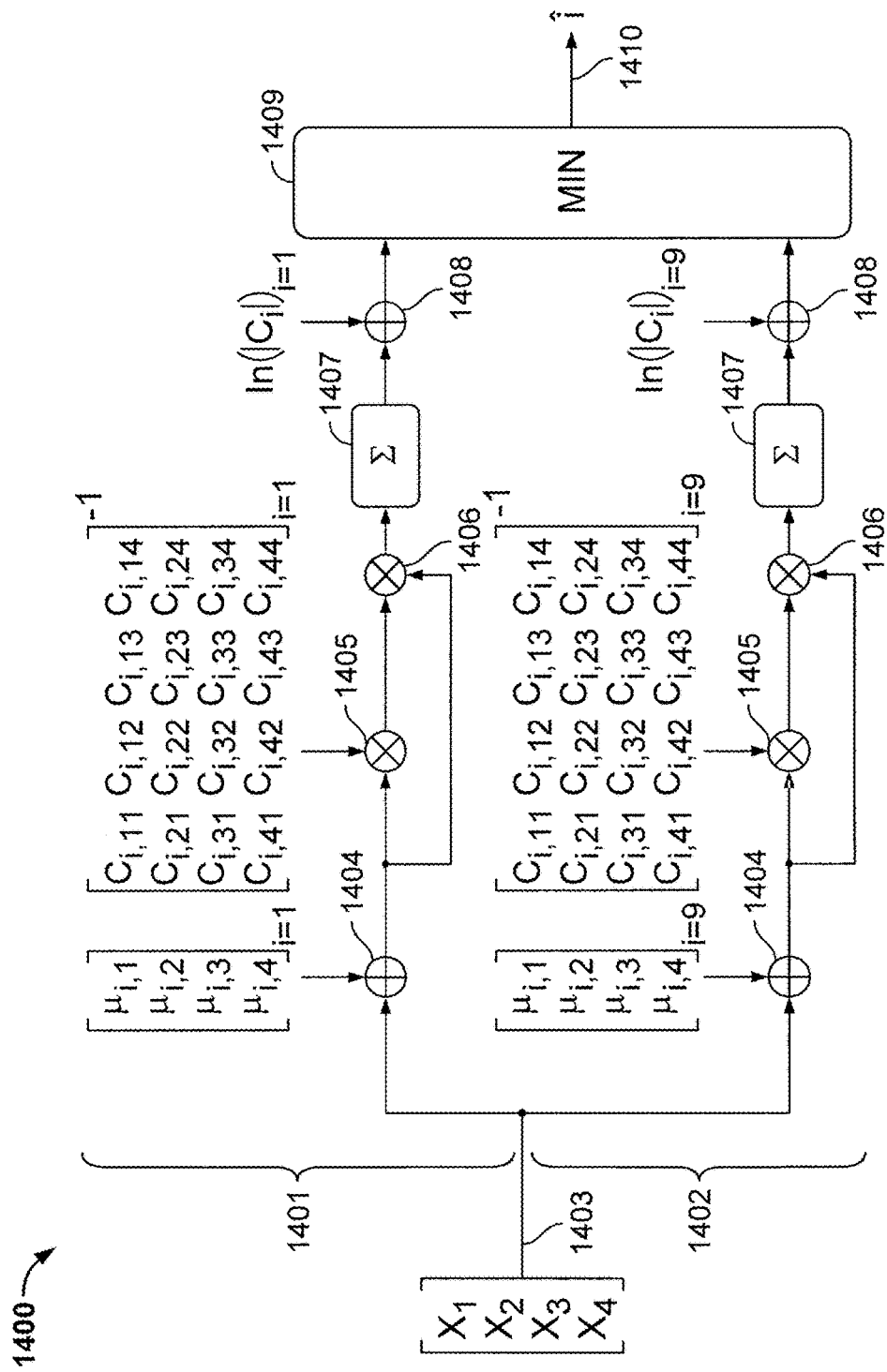
FIG. 14 is a schematic representation of a maximum likelihood detector circuit according to a first variant of a magnitude-based implementation of the subject matter of this disclosure.

A maximum likelihood detector circuit 1400 for determining $\hat{i}$ according to one variant of a magnitude-based implementation of the subject matter of this disclosure is shown in FIG. 14. Although FIG. 14 shows two paths 1401, 1402 for computing the i=1 case and the i=9 case, additional paths for i=2 through i=7 cases also are present. x is input to all paths 1401, 1402 at 1403. $\mu_i$ is input to respective adder/subtractor 1404 which computes $x-\mu_i$. The respective inverse matrix $C^{-1}{}_i$ is input to respective multiplier 1405, which computes $(x-\mu_i)^T C_i^{-1}$ including the transposition of $x-\mu_i$. That result is then multiplied by $x-\mu_i$ at respective multiplier 1406. The multiplications are matrix multiplications and in this implementation, respective multipliers 1405, 1406 multiply one element at a time and the results are accumulated in respective accumulators 1407. R Respective adder 1408 adds in the natural logarithm of the determinant of the respective matrix $C_i$. The same occurs in every path 1401, 1402 and the minimum of all paths is determined at 1409, yielding $\hat{i}$ at 1410.

A second variant a magnitude-based implementation of the subject matter of this disclosure has multiple modes. In a first mode, equal distributions are assumed as in the second variant of the first implementation, so that:

$$C_i = \begin{bmatrix} \sigma^2 & 0 & 0 & 0 \\ 0 & \sigma^2 & 0 & 0 \\ 0 & 0 & \sigma^2 & 0 \\ 0 & 0 & 0 & \sigma^2 \end{bmatrix}$$

which reduces circuit 1400 in manner similar to the way circuit 1200 is reduced to circuit 1300.

In other modes of this variant, different diagonals are assumed to be all zeroes. Thus, in a second mode, only the main diagonal has non-zero values but the values are not all the same:

$$C_i = \begin{bmatrix} C_{i,11} & 0 & 0 & 0 \\ 0 & C_{i,22} & 0 & 0 \\ 0 & 0 & C_{i,33} & 0 \\ 0 & 0 & 0 & C_{i,44} \end{bmatrix}$$

In a third mode, the main diagonal and two side diagonals have non-zero values:

$$C_i = \begin{bmatrix} C_{i,11} & C_{i,12} & 0 & 0 \\ C_{i,21} & C_{i,22} & C_{i,23} & 0 \\ 0 & C_{i,32} & C_{i,33} & C_{i,34} \\ 0 & 0 & C_{i,43} & C_{i,44} \end{bmatrix}$$

In a fourth mode, the main diagonal and four side diagonals have non-zero values:

$$C_i = \begin{bmatrix} C_{i,11} & C_{i,12} & C_{i,13} & 0 \\ C_{i,21} & C_{i,22} & C_{i,23} & C_{i,24} \\ C_{i,31} & C_{i,32} & C_{i,33} & C_{i,34} \\ 0 & C_{i,42} & C_{i,43} & C_{i,44} \end{bmatrix}$$

In a fifth mode, alternating diagonals have non-zero values:

$$C_i = \begin{bmatrix} C_{i,11} & 0 & C_{i,13} & 0 \\ 0 & C_{i,22} & 0 & C_{i,24} \\ C_{i,31} & 0 & C_{i,33} & 0 \\ 0 & C_{i,42} & 0 & C_{i,44} \end{bmatrix}$$

While the circuitry needed for the second through fifth modes is more like circuitry 1400 than circuitry 1300, the number of matrix elements to be multiplied and accumulated is smaller.

It can be shown that using all of the magnitudes to compute the minimum distance, rather than taking their ratios first, results in more accurate determinations, because some information is lost in the taking of the ratios.

Figure 15:
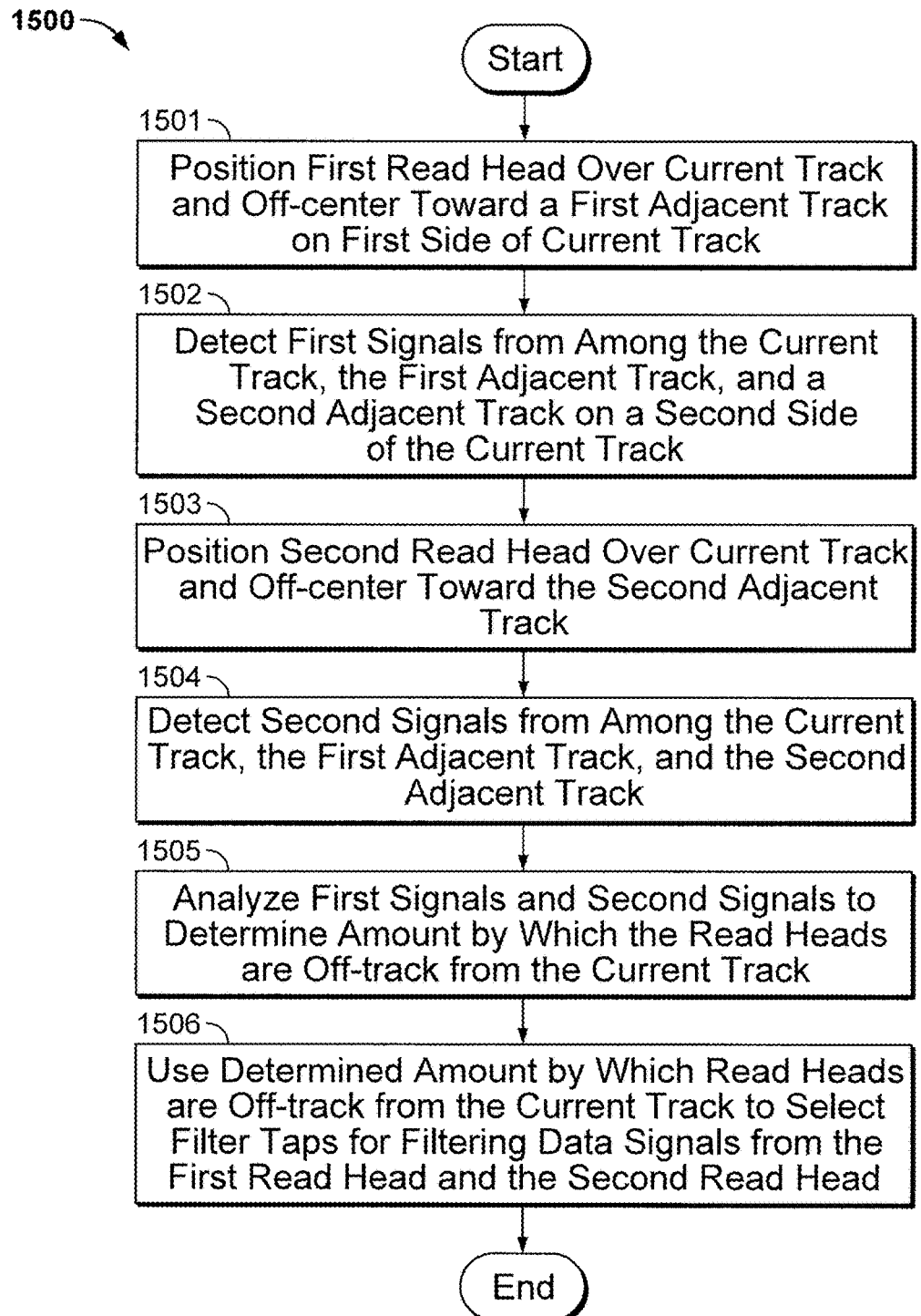
FIG. 15 is a flow diagram of an implementation of a method of operating a storage device including an off-track detector according to this disclosure.

A method 1500 of operating a storage device including an off-track detector according to this disclosure is diagrammed in FIG. 15. At 1501, a first read head is positioned over the current track and off-center toward a first adjacent track on a first side of the current track. At 1502, first signals are detected from among the current track, the first adjacent track, and a second adjacent track on a second side of the current track. At 1503, a second read head is positioned over the current track and off-center relative to the current track toward the second adjacent track. At 1504, second signals are detected from among the current track, the first adjacent track, and the second adjacent track. At 1505, the first signals and the second signals are analyzed to determine an amount by which the read heads are off-track from the current track. Optionally, at 1506, the determined amount by which the read heads are off-track from the current track is used to select filter taps for filtering data signals from the first read head and the second read head.

Figure 16:
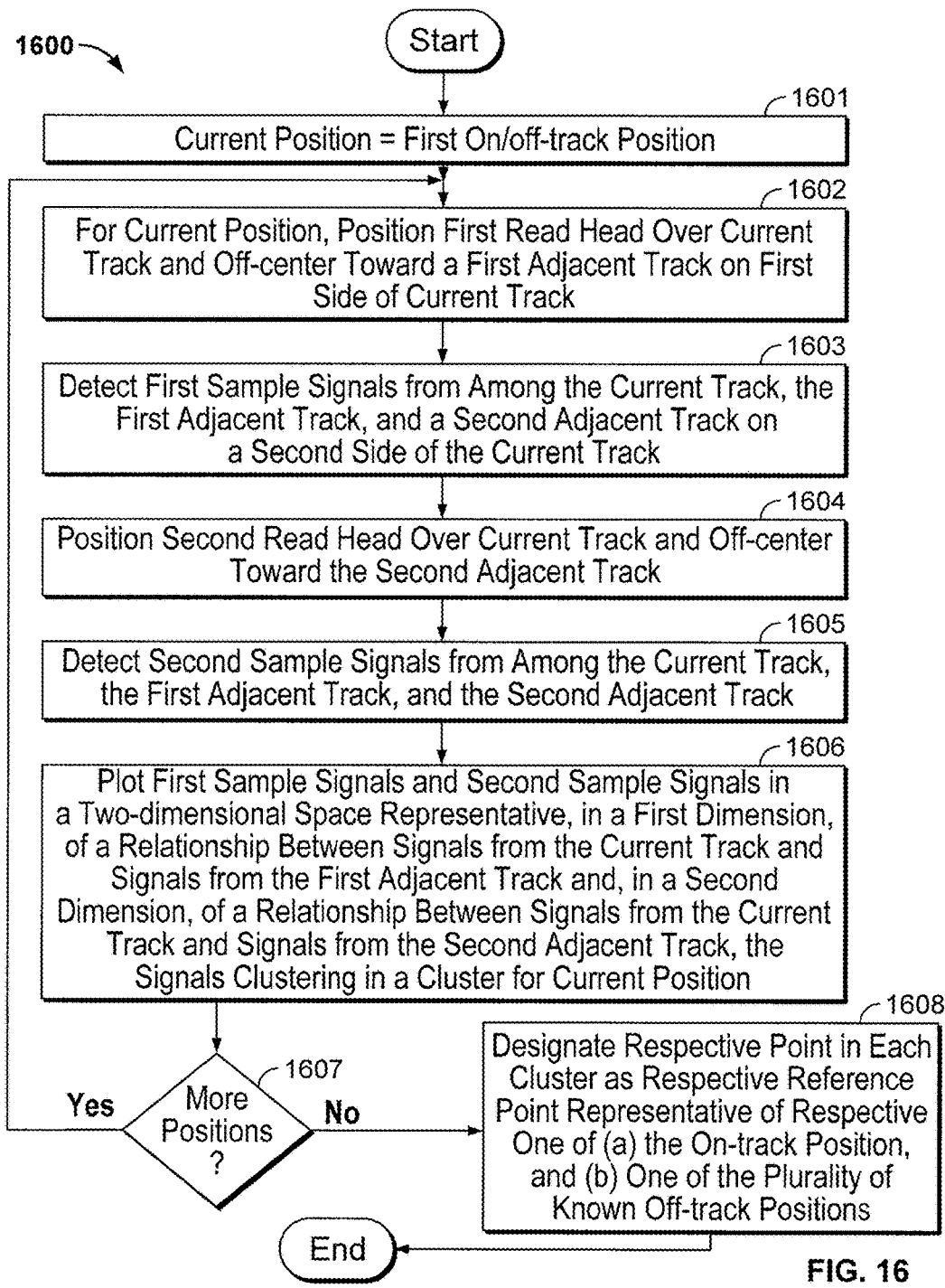
FIG. 16 is a flow diagram of an implementation of a method of calibrating an off-track detector in a storage device according to this disclosure.

A method 1600 of operating a storage device including an off-track detector according to this disclosure is diagrammed in FIG. 16. At 1601, the current one of (a) an on-track position, and (b) a plurality of known off-track positions, is set to the first position. At 1602, for the current one of (a) the on-track position, and (b) the plurality of known off-track positions, a first read head is positioned over the current track and off-center relative to the current track toward a first adjacent track on a first side of the current track. At 1603, a plurality of first sample signals are detected from among the current track, the first adjacent track, and a second adjacent track on a second side of the current track. At 1604, a second read head is positioned over the current track and off-center relative to the current track toward the second adjacent track. At 1605, a plurality of second sample signals are detected from among the current track, the first adjacent track, and the second adjacent track. At 1606, the plurality of first sample signals and the plurality of second sample signals are plotted in a two-dimensional space representative, in a first dimension, of a relationship between signals from the current track and signals from the first adjacent track and, in a second dimension, of a relationship between signals from the current track and signals from the second adjacent track, the plurality of first sample signals and the plurality of second sample signals clustering in a cluster for a current one of (a) the on-track position, and (b) the plurality of known off-track positions. At 1607, it is determined whether there are any more of (a) the on-track position, and (b) the plurality of known off-track positions. If so, flow returns to 1601 for the next one of (a) the on-track position, and (b) the plurality of known off-track positions. If, at 1607, there are no more of (a) the on-track position, and (b) the plurality of known off-track positions, then at 1608, a respective point is designated in each respective cluster, each respective point being a respective reference point representative of a respective one of (a) the on-track position, and (b) one of the plurality of known off-track positions.

As used herein and in the claims which follow, the construction "one of A and B" shall mean "A or B."

It will be understood that the foregoing is only illustrative of the principles of the invention, and that the invention can be practiced by other than the described embodiments, which are presented for purposes of illustration and not of limitation, and the present invention is limited only by the claims which follow.

What is claimed is:

1. A method of operating a storage device having a storage medium, wherein data is written to tracks on the storage medium, data for each track including a preamble, and wherein the preamble in any current track is orthogonal to the preamble in any track adjacent to the current track, the method comprising:
   positioning a first read head over the current track and off-center toward a first adjacent track on a first side of the current track, and detecting a first set of signals from the current track, the first adjacent track, and a second adjacent track on a second side of the current track;
   positioning a second read head over the current track and off-center relative to the current track toward the second adjacent track, and detecting a second set of signals from the current track, the first adjacent track, and the second adjacent track; and
   analyzing the first set of signals from the current track, the first adjacent track, and the second adjacent track, and the second set of signals from the current track, the first adjacent track, and the second adjacent track, to determine an amount by which the first read head and the second read head are off-track from the current track.

2. The method of claim 1 further comprising using the determined amount by which the first read head and the second read head are off-track from the current track to select filter taps for filtering data signals from the first read head and the second read head.

3. The method of claim 1 wherein the analyzing comprises deriving a respective magnitude of preamble signals from the current track, the first adjacent track, and the second adjacent track.

4. The method of claim 3 wherein the deriving comprises applying a Discrete Fourier Transform to the preamble signals from the current track, the first adjacent track, and the second adjacent track.

5. The method of claim 3 wherein the analyzing comprises:
   in a two-dimensional space representative, in a first dimension, of a relationship between signals from the current track and signals from the first adjacent track and, in a second dimension, of a relationship between signals from the current track and signals from the second adjacent track, computing respective distances between a point representative of positions of the first read head and the second read head and each of a plurality of respective predetermined reference points representative of an on-track position and different off-track positions;
   determining a minimum respective distance among the respective distances; and
   declaring one of the off-track positions, represented by the respective predetermined reference point for which the respective distance is the minimum respective distance, to be the off-track position of the first read head and the second read head.

6. The method of claim 5 further comprising deriving the point representative of positions of the first read head and the second read head by:
   receiving from the first read head a first read-head signal having a magnitude representing the preamble in the current track and a second read-head signal having a magnitude representing the preamble in the first adjacent track;
   receiving from the second read head a third read-head signal having a magnitude representing the preamble in the current track and a fourth read-head signal having a magnitude representing the preamble in the second adjacent track; and
   processing the first, second, third and fourth read-head signals to derive the point representative of positions of the first read head and the second read head.

7. The method of claim 6 wherein the processing the first, second, third and fourth read-head signals comprises applying matrix algebra techniques to the first, second, third and fourth read-head signals.

8. The method of claim 6 wherein the processing the first, second, third and fourth read-head signals comprises:
  taking a ratio of the second read-head signal to the first read-head signal as one coordinate of the point representative of positions of the first read head and the second read head; and
  taking a ratio of the fourth read-head signal to the third read-head signal as another coordinate of the point representative of positions of the first read head and the second read head.

9. The method of claim 5 wherein:
  the respective predetermined reference points are derived from respective clusters of calibration samples; and
  the determining a minimum respective distance among the respective distances comprises treating the respective clusters of calibration samples uniformly.

10. The method of claim 5 wherein:
  the respective predetermined reference points are derived from respective clusters of calibration samples; and
  the determining a minimum respective distance among the respective distances comprises accounting for actual distribution of samples within each respective cluster of calibration samples.

11. A method of calibrating a storage device having a storage medium, wherein data is written to tracks on the storage medium, data for each track including a preamble, wherein the preamble in any current track is orthogonal to the preamble in any track adjacent to the current track, the method comprising:
  for each of (a) an on-track position, and (b) a plurality of known off-track positions:
  positioning a first read head over the current track and off-center relative to the current track toward a first adjacent track on a first side of the current track, and detecting a plurality of first sample signals from the current track, the first adjacent track, and a second adjacent track on a second side of the current track,
  positioning a second read head over the current track and off-center relative to the current track toward the second adjacent track, and detecting a plurality of second sample signals from the current track, the first adjacent track, and the second adjacent track, and
  in a two-dimensional space representative, in a first dimension, of a relationship between signals from the current track and signals from the first adjacent track and, in a second dimension, of a relationship between signals from the current track and signals from the second adjacent track, plotting the plurality of first sample signals and the plurality of second sample signals in a cluster for a current one of (a) the on-track position, and (b) the plurality of known off-track positions; and
  designating a respective point in each respective cluster, each respective point being a respective reference point representative of a respective one of (a) the on-track position, and (b) one of the plurality of known off-track positions.

12. A storage device, comprising:
  read circuitry including:
  a first read head positioned over a current track of a storage medium and positioned off-center relative to the current track toward a first adjacent track on a first side of the current track, data on each track including a preamble including a repeating pattern, wherein the repeating pattern in any current track is orthogonal to the repeating pattern in any track adjacent to the current track, the first read head detecting a first set of signals from the current track, the first adjacent track, and a second adjacent track on a second side of the current track;
  a second read head positioned over the current track and off-center relative to the current track toward the second adjacent track, and detecting a second set of signals from the current track, the first adjacent track, and the second adjacent track; and
  circuitry for analyzing the first set of signals from the current track, the first adjacent track, and the second adjacent track, and the second set of signals from the current track, the first adjacent track, and the second adjacent track, to determine an amount by which the first read head and the second read head are off-track from the current track.

13. The storage device of claim 12 further comprising:
  a filter for filtering the first signals and the second signals; and
  memory for storing filter taps for the filter; wherein:
  the circuitry for analyzing uses the determined amount by which the first read head and the second read head are off-track from the current track to select filter taps for the filter from the memory.

14. The storage device of claim 12 wherein:
  the circuitry for analyzing derives a respective magnitude of preamble signals from the current track, the first adjacent track, and the second adjacent track.

15. The storage device of claim 14 wherein the circuitry for analyzing further comprises Discrete Fourier Transform circuitry configured to derive the respective magnitude of preamble signals from the current track, the first adjacent track, and the second adjacent track.

16. The storage device of claim 15 wherein:
  the circuitry for analyzing computes, in a two-dimensional space representative, in a first dimension, of a relationship between signals from the current track and signals from the first adjacent track and, in a second dimension, of a relationship between signals from the current track and signals from the second adjacent track, respective distances between a point representative of positions of the first read head and the second read head and each of a plurality of respective predetermined reference points representative of an on-track position and different off-track positions;
  the circuitry for analyzing determines a minimum respective distance among the respective distances; and
  the circuitry for analyzing declares one of the off-track positions, represented by the respective predetermined reference point for which the respective distance is the minimum respective distance, to be the off-track position of the first read head and the second read head.

17. The storage device of claim 16 wherein the circuitry for analyzing derives the point representative of positions of the first read head and the second read head by:
  receiving from the first read head a first read-head signal having a magnitude representing the preamble in the current track and a second read-head signal having a magnitude representing the preamble in the first adjacent track;
  receiving from the second read head a third read-head signal having a magnitude representing the preamble in the current track and a fourth read-head signal having a magnitude representing the preamble in the second adjacent track; and
  processing the first, second, third and fourth read-head signals to derive the point representative of positions of the first read head and the second read head.

18. The storage device of claim 17 wherein the circuitry for analyzing processes the first, second, third and fourth read-head signals by applying matrix algebra techniques to the first, second, third and fourth read-head signals.

19. The storage device of claim 17 wherein the circuitry for analyzing processes the first, second, third and fourth read-head signals by:
   taking a ratio of the second read-head signal to the first read-head signal as one coordinate of the point representative of positions of the first read head and the second read head; and
   taking a ratio of the fourth read-head signal to the third read-head signal as another coordinate of the point representative of positions of the first read head and the second read head.

20. The storage device of claim 16 wherein:
   the respective predetermined reference points are derived from respective clusters of calibration samples; and
   the circuitry for analyzing treats the respective clusters of calibration samples uniformly when determining a minimum respective distance among the respective distances.

21. The storage device of claim 16 wherein:
   the respective predetermined reference points are derived from respective clusters of calibration samples; and
   the circuitry for analyzing accounts for actual distribution of samples within each respective cluster of calibration samples when determining a minimum respective distance among the respective distances.

* * * * *